July 24, 1962

S. C. SHAPPELL 3,045,805

TRANSFER SYNCHRONIZER

Filed July 22, 1958

INVENTOR.
STANLEY C. SHAPPELL
BY
KENWAY, JENNEY, WITTER & HILDRETH

ATTORNEYS

INVENTOR.
STANLEY C. SHAPPELL
BY KENWAY, JENNEY, WITTER & HILDRETH
ATTORNEYS

INVENTOR.
STANLEY C. SHAPPELL
BY
KENWAY, JENNEY, WITTER & HILDRETH

ATTORNEYS

United States Patent Office 3,045,805
Patented July 24, 1962

---

3,045,805
TRANSFER SYNCHRONIZER
Stanley C. Shappell, West Boxford, Mass., assignor, by mesne assignments, to Sylvania Electric Products Inc., Wilmington, Del., a corporation of Delaware
Filed July 22, 1958, Ser. No. 750,141
7 Claims. (Cl. 198—76)

This invention relates in general to automatic machinery and in particular to the transfer of articles from one unit of automatic machinery to another.

Numerous occasions arise in automatic handling of articles where it is necessary to transfer articles from one unit of a system to another. In such transfer operations some degree of synchronization between the unit delivering the article and the unit receiving the article is desirable or even necessary. This is especially true in manufacturing operations where one process step may be performed on articles carried in cradles of the delivering unit and another on articles carried in cradles of the receiving unit. In the most obvious case, if the receiving unit is completely shut down for one reason or another, it is certainly necessary to discontinue the delivery of articles during the period of shutdown. In the case of slowdown of the receiving unit, the same problem exists. The capacity of the receiving unit cannot be exceeded by the delivering unit, or a chaotic condition arises. Conversely, and again especially in automatic manufacturing, it is usually undesirable that processing operations be continued by the receiving unit when no articles are being delivered to it because of shut down or slowdown of the delivering unit.

It is with this synchronizing problem that the present invention is concerned. Although the invention is described in connection with automatic lamp manufacturing machinery in this specification, its applicability to the general problem of article handling and transfer will be clearly seen.

The general object of the invention is to provide synchronization between an automatic article-delivering unit and an automatic article-receiving unit.

Another object of the invention is to synchronize the operation of two conveyors such that a delivery position of a cradle on the one conveyor coincides with a receiving position of a cradle on the other conveyor at the moment of transfer.

Still another object of the present invention is to improve the efficiency of automatic article handling and transfer.

A further object of the present invention is to prevent damage or loss of articles being transferred from one conveyor to another.

In general, the present invention consists in an electromechanical control of the speed of one conveyor and the position of its article-holding cradles relative to the speed of a second conveyor and position of its article-holding cradles. In the particular embodiment of the invention described herein, the articles being handled are fluorescent lamps which are being delivered from an automatic exhaust conveyor to an automatic basing conveyor. The number of cradles or article-handling positions need not be the same or equally spaced on each conveyor because the synchronizer of the invention does not depend upon or provide a simple matching of speeds of the conveyors. If the exhaust conveyor be considered the master unit and the basing conveyor the slave unit, the basing conveyor is made to present a receiving cradle to a delivering cradle of the exhaust conveyor whenever a lamp is to be transferred.

The accomplishment of this result is effected by a control system which senses a loss of synchronization and changes the speed of the slave unit and the position of its cradles to regain that synchronization. In other words, by means of a continuously operating control, delivery cradles are maintained in alignment with receiving cradles for proper transfer. The control derives its input information by sensing differences in speed between the two conveyors. Although numerous alternatives might be used, a convenient device for such sensing is a planetary differential gear system. An internally toothed drive gear is driven through a gear train of suitable ratio by the drive shaft of the master conveyor. An idler gear, concentrically mounted with the drive gear is driven through another gear train of suitable ratio by the drive shaft of the slave conveyor. Interposed in the slave drive system, however, is a position-selective slip clutch which has external teeth meshing with those of the idler gear. In one embodiment, a pair of differential gears are mounted on a differential arm, one on either side of the idler gear, and both meshing with the idler gear and the master drive gear. Alternatively, a single differential gear may be adjustably mounted on the differential arm, but meshing with the idler gear and master drive gear in the same manner as the two differential gears.

When the speeds of the drive shafts of the master conveyor and the slave conveyor are synchronized, the differential arm does not rotate about its pivot point; and when the transfer positions of the master and slave conveyor are synchronized, the arm is horizontally disposed. When, however, the shaft speeds fall out of synchronization as when an excessive load is placed on one conveyor or the other of if an interruption of power occurs, the speeds of the idler gear and the master drive gear are no longer the same. The differential arm then begins to rotate, immediately triggering a switch which either speeds up or slows down the slave conveyor to regain speed synchronization.

If it be assumed that the conveyor loading or other disturbing force is such as to slow down the slave conveyor, the slave conveyor is actually then speeded up until it is running slightly faster than the master conveyor. It is then slowed down again until it is running slower than the master conveyor by a very slight amount. This oscillating correction continues until the differential arm resumes its normal horizontal position with the two conveyors synchronized for transfer. The position-selective slip clutch assures that the synchronization is related to a cradle position on the slave conveyor.

The same position-selective slip clutch which operates to provide transfer position synchronization serves as a fail-safe device to prevent damage when transfer position synchronization cannot be effected as, for example, when one unit or the other is completely shut down. For a better understanding of the present invention, together with other objects, features, and advantages, reference should be made to the following detailed description of a preferred embodiment of the invention, which should be read in conjunction with the attached drawing in which.

Figure 1:
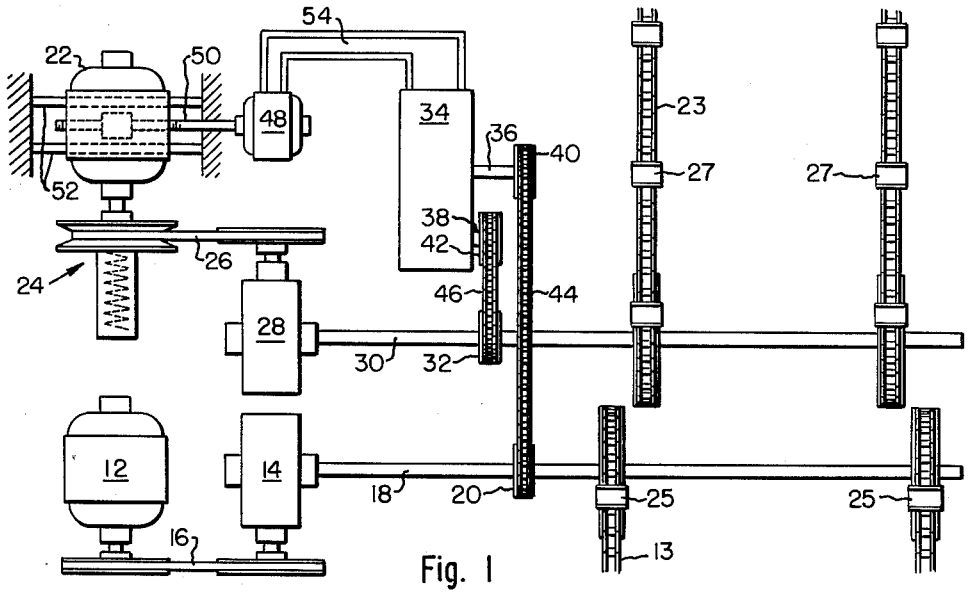
FIG. 1 is a schematic layout of the component parts of the system is utilized in the control of transfer synchronization of two conveyors.

In the schematic system plan view of FIG. 1, there may be seen a drive motor 12 which powers the leading or master conveyor 13. A reduction gear 14 is driven by the drive motor 12 by means of a V-belt 16 or other suitable transmission device. The reduction gear 14 drives a main shaft 18 of the master conveyor. A sprocket 20 is mounted on the main shaft.

A second drive motor 22 powers the trailing or slave conveyor 23 through a variable speed pulley 24 mounted on the shaft of the motor 22. The variable speed pulley 24 is connected by a V-belt 26 to a reduction gear 28 which drives a main shaft 30 of the slave conveyor. A sprocket 32 is mounted on the slave conveyor main shaft.

A sensing or control unit 34 is provided with two input shafts 36 and 38 on which the sprockets 40 and 42, respectively, are mounted. The shaft 36 is spaced from the shaft 38 and the sprocket 42 may, as shown, be mounted somewhat closer to the control unit than the sprocket 40 to avoid interference between the two. A drive chain 44 connects the sprocket 40 to the sprocket 20 on the main shaft 18. The ratio of teeth in sprocket 20 to those in sprocket 40 is properly selected to give a desired relationship between the spacing of lamp-holding cradles 25 on the master conveyor and rotation of the shaft 36 as is explained in greater detail below.

In similar fashion the drive chain 46 connects the sprockets 32 and 42 and, again, the ratio of sprocket teeth is determined by the spacing of lamp-holding cradles 27 on the slave conveyor. For the present, at least, it is to be understood that the shafts 36 and 38 turn at equal speeds when the cradles of the master conveyor are running in alignment with the cradles of the slave conveyor at the point of transfer of lamps.

A suitable mechanism for providing reciprocatory motion such as the illustrated reversible electric motor 48 and threaded shaft 50 is connected to the slave conveyor drive motor 22 by means of a threaded sleeve, not shown, which is fixed to the motor 22 and engaged by the threaded shaft 50. The motor 22 is slidable on the ways 52 in response to rotation of the shaft 50. The diameter of the variable speed pulley 24 changes in response to changes in motor position causing a change in speed of the input shaft of the reduction gear 28 and a corresponding change of speed of the slave conveyor drive shaft 30 and the input shaft 38 of the control unit 34. From the control unit the extent and direction of rotation of the shaft of the reversible motor 48 is determined by a switching circuit which includes the leads 54.

Figure 2:
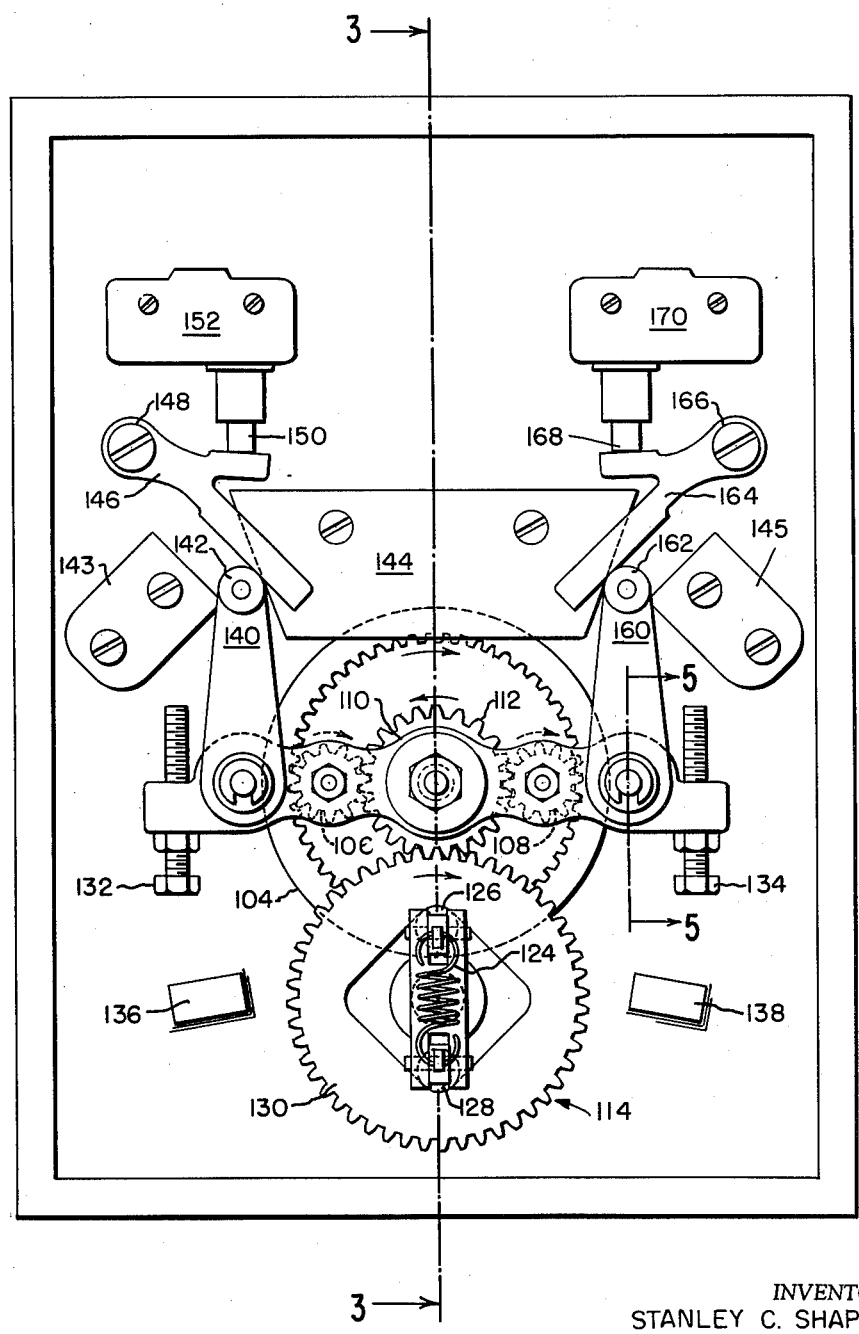
FIG. 2 is a front elevation, partly cut away, of the sensing or control unit of the invention.
Figure 3:
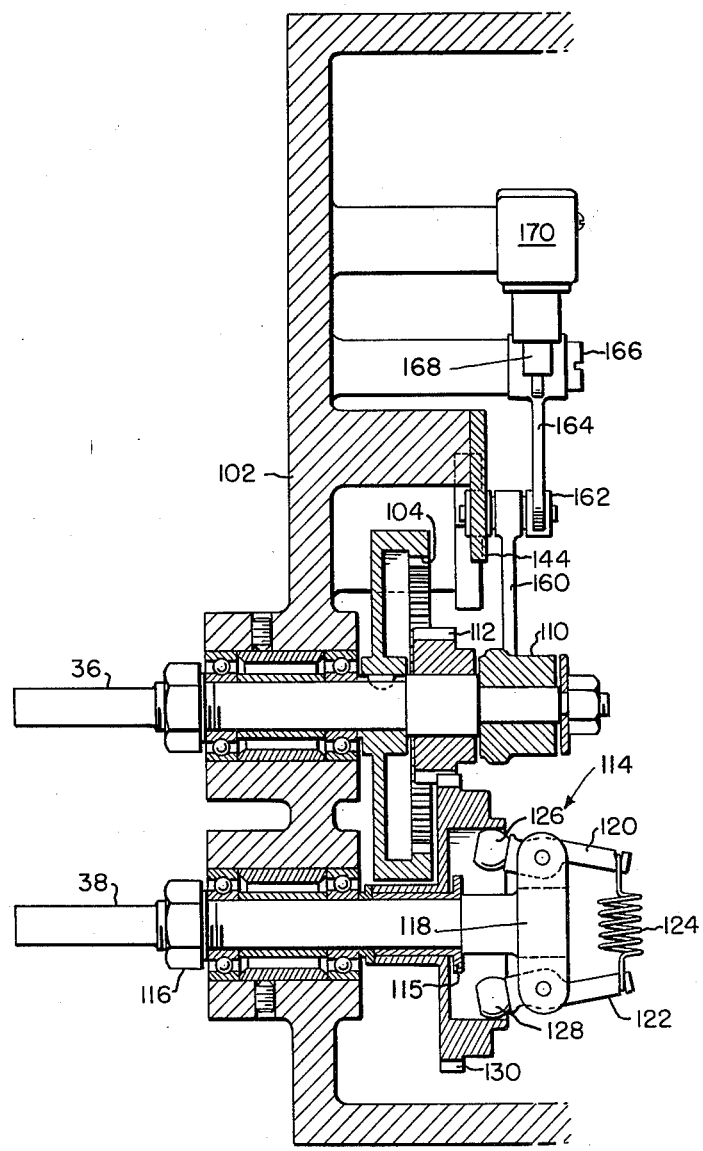
FIG. 3 is a side elevation, also partly in section, of the unit illustrated in FIG. 2.

The operation of the control system which speeds up or slows down the slave conveyor and adjusts the locations of the cradles of the slave conveyor to provide proper alignment between cradles of the master and slave conveyors for lamp transfer is best understood by considering FIGS. 2 and 3.

The shaft 36, which derives its rotation ultimately from the master conveyor drive motor 12, is journalled in suitable bearings in a housing 102 for the control device. Keyed to the shaft 36, or otherwise fixed for rotation with the shaft, is an internally toothed upper drive gear 104. In this embodiment of the invention, there are meshing with the upper drive gear 104 two differential gears 106 and 108 which are mounted adjacent opposite ends of a differential arm 110. The differential arm 110 is rotatable about a stepped extension of the shaft 36 to which the upper drive gear 104 is keyed. An idler gear 112 meshing with the two differential gears 106 and 108 is also rotatable about a stepped extension of shaft 36. The arm 110 and the idler gear 112 may be mounted on bushings which are clamped in place on the shaft extension, but any suitable mounting which permits rotation of the two relative to the shaft will suffice.

The idler gear 112, besides meshing with the differential gears 106 and 108, is in mesh with a gear 130 of a position-selective slip clutch 114. The connection of the slip clutch 114 to the slave conveyor drive shaft is best illustrated in FIG. 3. Here the structure is quite different from that employed in the master conveyor drive shaft arrangement. The slave drive shaft 38 passes through the housing 102 and is suitably journalled for rotation in bushings. The bushing 115 has a flared end and the nut 116 is provided to draw the bearing members tightly into position relative to the housing.

The shaft 38 terminates in a slotted pivot block 118 at opposite ends of which the selector arms 120 and 122 are pivotally mounted. A tension spring 124, the ends of which are retained in slots in the selector arms, serves to urge the outer arm ends together. At the inner arm ends rollers 126 and 128 are provided. The position-selective slip clutch 114, the gear 130 of which has outer peripheral teeth in mesh with those of the idler gear 112, also has four equally spaced corner recesses for engaging the rollers 126 and 128. The corner recesses function as detents, and when a retarding force sufficient to overcome the tension of the spring 124 is exerted against the rotation of the clutch 114, the drive shaft 38 forces the pivot block to rotate through 90 degrees relative to the clutch 114 where the other two detents engage the rollers 126 and 128.

At the extreme ends of the differential arm 110 are adjustable stops 132 and 134 designed to engage the limit blocks 136 and 138 respectively at extreme excursions from the horizontal of the differential arm 110. Intermediate the gear 106 and the adjustable stop 132 on the differential arm 110 there is mounted a hunting arm 140. The arm 140 is mounted for frictional pivoting movement about a pin as is explained in greater detail below in connection with FIG. 5. Another pin is fixed in the hunting arm 140 and carries a roller 142 at its upper end. The roller 142, when the differential arm 110 is in a horizontal position, is in contact with the diagonal surface of a dividing block 144. The roller 142 may also, under similar conditions, be in contact with a switch trigger 146 which pivots about a pin 148 to actuate a switch blade plunger 150 of a switch 152. Although the roller 142 is in contact with the trigger 146, it does not move the trigger until the differential arm rotates from the horizontal. The arm 160, the roller 162, the switch trigger 164, the pin 166, the plunger 168, and the switch 170 constitute a mirror image of the counterpart assembly just described. A pair of similar reset blocks 143 and 145 along which rollers 142 and 162 respectively are guided on their return to their normal positions complete the sensing unit.

Figure 5:
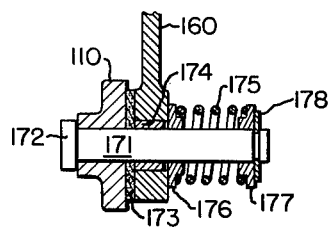
FIG. 5 is a sectional view of the frictional pivot of the hunting arm taken along the lines 5—5 of FIG. 2.

Some detail on the frictional pivoting structure of the hunting arms 140 and 160 is disclosed in FIG. 5. A pin 171 passes through the differential arm 110 with its head or stud 172 butted against a side of the arm. Adjacent the other side of the arm, there is a friction washer 173. Next is the hunting arm 160 mounted on a bushing 174 on the pin 171. A spring 175 and its retainers 176 and 177 are held under compression by means of a retaining ring 178 held in a slot in the pin 171.

The compression spring 175 exerts a considerable force and permits rotation of the hunting arm 160 about the pin 171 only in response to forces of reasonable magnitude. As a result the hunting arm tends to remain in any position which it is forced to assume. Of course, the hunting arm 160 is similarly set up and pivoted.

Understanding of the operation of the invention is facilitated by considering the sequence of events which occur when the two conveyors fall out of synchronism. Let it be assumed that a heavy load is suddenly placed on the slave or receiving conveyor, slowing it down. If the normal rotation of the master conveyor drive shaft is in the direction indicated by the arrow adjacent the upper drive gear 104 in FIG. 2, the rotation of the differential gears 106 and 108 is also in a clockwise direction as indicated by the arrows adjacent their peripheries.

The rotation of the slave conveyor drive shaft 38 is also clockwise as it is seen in FIG. 2 and indicated by the arrow on the surface of the gear 130 of the position-selective slip clutch 114. The idler gear 112, since it meshes with the gear 130 of the slip clutch 114 and with the differential gears 106 and 108, turns in a counter-clockwise direction and this rotation also is indicated in FIG. 2 by the arrow adjacent its periphery.

Now, returning to the assumption that the slave conveyor is slowed down by a load or for other reasons, it is clear that the speed of the upper drive gear 104 will become greater than that of the slip clutch 114. The resulting reduced speed of the idler gear 112 relative to that of the drive gear 104 causes the differential arm 110 to rotate in a clockwise direction about its central pivot point. Immediately, the arm 140 lifts and the roller 142, guided by the dividing block 144, goes up at an angle to the vertical, causing the trigger 146 to pivot about the pin 148, actuating the switch 152 through the plunger 150 at the beginning of its travel. The arm 140, although pivotally connected to the differential arm 110, turns only in response to applied forces of considerable magnitude because of the spring-loading or other suitable frictional resistance in the pivot described above. The dividing block 144 operating against the rotation of the differential arm 110 provides such forces.

As may best be seen in FIG. 1, triggering of the switch 152 actuates the reversing motor 48. Rotation of the shaft 50 then causes the drive motor 22 to move in the proper direction on its track. In the situation here assumed the motor 22 commences to move toward the reversing motor 48, the tension of the V-belt 26 becomes lessened in some degree, and the variable speed pulley increases in diameter. The increase in diameter of the variable speed pulley 24 causes the pulley of the reduction gear 28 to speed up and, correspondingly, the main shaft 38 also increases in speed. As long as the switch 152 remains closed, the reversing motor 48 is energized, and the increase of speed throughout the slave system continues. The increase in speed of the slave conveyor shaft does not cease immediately when it is equal to the speed of the master conveyor shaft 36. Clockwise rotation of the differential arm 110 ceases, leaving the arm at an angle to the horizontal and the switch trigger 146 still deflected by the roller 142. However, because the switch 152 remains closed with the arm in a deflected position, the speed increase of the shaft 38 continues until it is actually turning at a faster rate than the master conveyor shaft 36.

As a result of the greater speed of the shaft 38 relative to the shaft 36, the differential arm 110 begins to turn in a counter-clockwise direction. The roller 142 follows the surface of the reset block 143 as the differential arm rotates in a counter-clockwise direction. The switch 152 opens almost immediately upon occurrence of the reversed rotation of the differential arm terminating further acceleration of the shaft 38. However, the speed of the slave conveyor shaft 38 remains greater than that of the master shaft until the differential arm 110 passes through the horizontal in its counter-clockwise travel.

As the differential arm 110 passes through the horizontal, the roller 162, following the right hand edge of the dividing block 144, forces the switch trigger 164 to pivot about its pin 166. Switch 170 then closes, the action being the same as that described in connection with switch 152. In this instance, however, speed correction in the opposite direction in a manner similar to that previously described is introduced immediately. However, the travel of the differential arm is much less than in the previous case because the original displacement was much greater than is now present. Depending upon the degree of the original disturbing force which threw the two conveyors out of synchronism, the differential arm 110 will undergo alternate clockwise and counter-clockwise excursions of decreasing amplitude until the arm is returned to its normal horizontal position. The decreasing excursions of the differential arm 110 about the horizontal are analogous to a damped oscillation about a reference voltage level.

Figure 4:
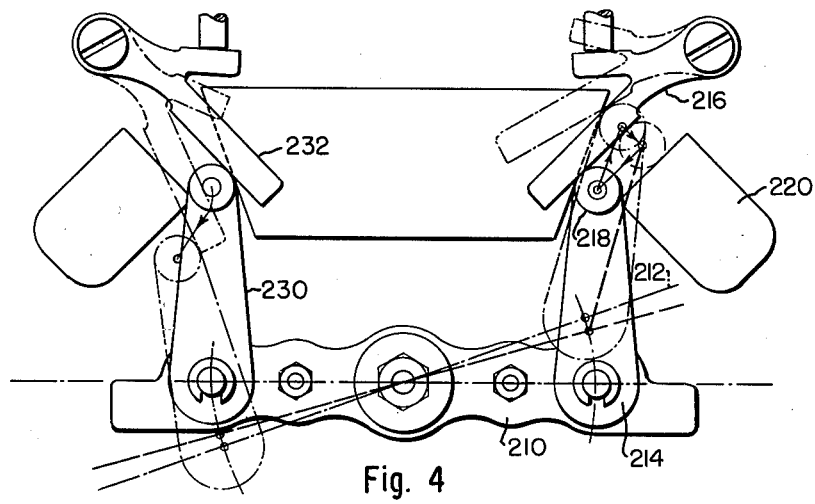
FIG. 4 is a schematic showing of the differential and hunting arms and switches of the sensing unit.

The decreasing excursions or dividing action by which error correction is effected are graphically illustrated in FIG. 4. A loss of synchronization sufficient to deflect the differential arm 210 as much as 20 degrees will be handled by the differential gear system without any change occurring in the position-selective slip clutch 114.

In this instance it is assumed that some condition has caused the master conveyor to be slowed down. The dot-dashed center line 212 indicates the position taken by the differential arm 210 when it is deflected a full 20 degrees in response to the slowed master conveyor. The hunting arm 214 is shown both in solid and in dot-dashed lines, the solid indicating its normal position when the differential arm 210 is undeflected, and the dot-dashed line its position after 20-degree deflection of the differential arm 210.

Provision is made to adjustably set the upper portion of the unit such that the switch trigger 216 can throw the switch in response to a deflection of as little as a single degree. Thus, the switch closes practically immediately and remains closed, deceleration of the slave conveyor being initiated immediately and continued during the entire rise time of the hunting arm, indicated by the hypotenuse of the triangle which illustrates the path of the roller 218. When the speed of the slave conveyor shaft finally becomes less than that of the main conveyor shaft, the arm 210 begins to rotate in a clockwise direction. The hunting arm drops to the right to the position indicated by the dashed showing of the roller 218 against the reset block 220. The roller follows the path indicated by the short leg of the triangular path. The roller follows this path because the pivoting action which takes place is about the extension of shaft 36, rather than about the frictional pivot shaft 171.

Sufficient clearance exists between the face of the reset block 220 and the undeflected switch trigger to pass the roller between the two. Thus, the switch opens and remains open as the differential arm continues its clockwise rotation. The reset block working against the resistance of the frictional pivot of the hunting arm forces the roller to follow the path indicated by the long leg of the roller triangle path diagram.

The fact that the speed of the slave conveyor drive shaft has been reduced to a point where it is less than that of the main conveyor shaft causes continued clockwise rotation of the differential arm until it again passes through the horizontal. At such time the hunting arm 230 commences its rise, immediately deflecting the switch trigger 232. A reverse sequence ensues, causing the speed of the slave conveyor shaft to increase until it becomes greater than that of the main conveyor shaft. The differential arm then rotates in a counter-clockwise direction until it again passes through the horizontal, after which speed of the slave conveyor shaft is again decreased. This dividing action continues, each excursion of the differential arm being less than the preceding one until the conveyors are synchronized in speed, cradles are aligned for transfer and the differential arm is once more in a horizontal position.

There will inevitably be instances where the speeding up of slowing down of one of the conveyors relative to the other is of extreme magnitude and beyond correction in the manner described immediately above. This is one of the reasons for the inclusion of the position-selective slip clutch 114 in the slave conveyor drive system. If, for example, the feeding or master conveyor were to stop, the differential arm would turn in a counter-clockwise direction and switch 170 would be actuated to slow down the slave conveyor. The normal corrective action could not follow, the hunting arm 160 would be at its extreme upper position and the adjustable stop 132 would be in contact with the stop 136. Obviously, any continued rotation of the shaft 38 even at lowered speed would lead to destructive consequences if no relief were provided. In such a situation the rollers 126 and 128 which are pivoted in the slotted block at the end of the shaft 138 are forced from their recesses in the position-selective slip clutch 114 and rotate through 90 degrees until they become lodged in the next pair of recesses of the slip clutch 114. If, as in the case of a break-down, the master conveyor had not then resumed operation, the rollers would once again rotate through 90 degrees until they lodged in the next pair of recesses. The tension spring 124 which urges the rollers apart is selected to permit transmission of power from the shaft 38 to the slip clutch 114 under normal circumstances, but is also chosen to permit the rollers to pivot upon the encounter of a predetermined resistive force by the slip clutch 114. Similar action may occur when the speed of the master conveyor is too great for the slave conveyor to match in the normal manner.

The design of the slip clutch 114 is such that when slipping action is forced to happen, the rollers 126 and 128 after reaching a mid-position between detents exert a camming force on the clutch 114. This camming action causes the clutch 114 to reverse its rotation through a slight angle permitting the differential arm 110 to resume its normal horizontal position. This sequence of events is repeated, of course, each time the position-selective slip clutch assumes a new position relative to the rollers 126 and 128.

Another function of the position-selective slip clutch is to relate the corrections which are made to cradle positions on the conveyors. A conventional slip clutch would permit synchronized operation of the conveyors to occur at any point. The illustrated clutch of the invention permits such synchronization to occur at only four precise points which are related by proper gearing to cradles of the slave conveyor. The position of the cradles on the master conveyor are related to those of the slave conveyor by means of the gearing between the two conveyors and the sensing unit as it is originally set-up. This function of the position-selective slip clutch is to return the system to its original condition after error correction.

The position-selective slip clutch may always have four or any other specific number of positions; it is only necessary that a proper gear ratio be provided to match the cradle spacing of the slave conveyor to the number of positions on the position-selective slip clutch.

Figure 6:
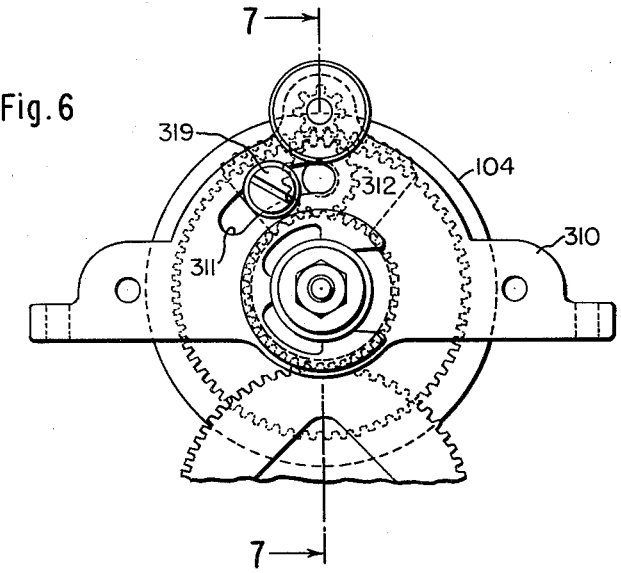
FIG. 6 is a front elevation of a portion of the sensing unit which includes the adjustable type of differential gear.
Figure 7:
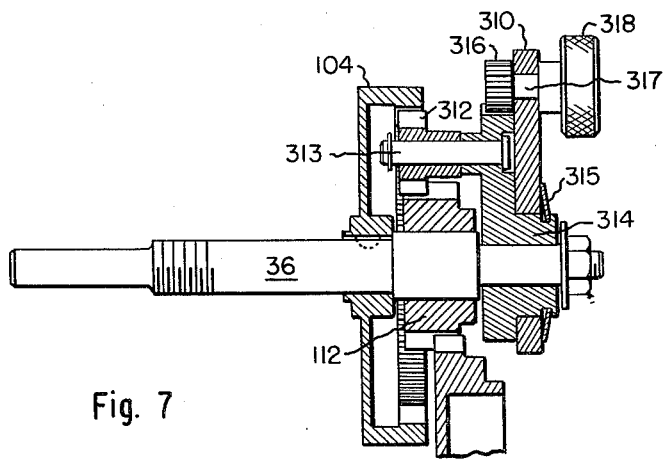
FIG. 7 is a section taken along the lines 7—7 of FIG. 6.

In the embodiment of the invention illustrated in FIGS. 6 and 7, provision is made to set up synchronized cradle positions at the sensing unit or to readjust positions during conveyor operation. In the unit disclosed above, sprocket positions had to be shifted to obtain desired relations between conveyor cradles. This is especially onerous when readjustment is needed, because the conveyors had to be shut down to permit changes to be made.

The unit illustrated in FIGS. 6 and 7 includes a differential arm 310 having an upper hemispherical section in which an arcuate slot 311 is cut. The internally toothed main drive gear 104 mounted on the shaft 36 is common to this as well as the previously described embodiment, as is the idler gear 112. In place of the two differential gears 106 and 108 though, is a single gear 312 meshing with the main drive and idler gears. The gear 312 is mounted for rotation on a shaft 313 which is held in place by a snap washer or other suitable means in a recess formed in a segmental gear 314. A hub is formed at one end of the segmental gear 314 and this hub is rotatable about a stepped extension of the shaft 36. The hub has a peripheral slot adjacent one of its ends. The differential arm 310 is fitted over the hub and retained in place by a snap ring 315 disposed in the peripheral slot.

Meshing with the teeth of the segmental gear 314 is an adjusting gear 316 mounted on a shaft 317 which passes through a suitable opening in the hemispherical position of the differential arm 310. A knurled adjusting knob 318 is provided at the opposite end of the shaft 317. Finally, a locking screw 319 threaded into the segmental gear 314 and passing through the arcuate slot 311 completes the assembly. The head of the locking screw or a washer under the head bears against the differential arm 310 as the screw is tightened.

Operation of the adjustment is effected by loosening the locking screw 319 and turning the knurled knob 318. Rotation thereby of the gear 316 causes rotation of the segmental gear 314. The differential gear 312 is carried to a new position as the segmental gear rotates about the extension of the shaft 36. The displacement of the differential gear relative to the differential arm results in a relative change between cradles at the transfer position and the locking screw can then be reset at the desired position.

Another adjustment feature of the invention which is common to both embodiments involves the switches and switch triggers. These may be changed in their location relative to the hunting arms to provide corrective action when minimum differences of speed between conveyors occur. In a specific situation, the switch triggers have been arranged such that a swing of only a single degree by the differential arm causes the affected switch to close and corrective action to take place.

It should be clearly understood and appreciated that the embodiments of the invention illustrated in the drawings and described herein are only typical preferred embodiments. Other means for sensing differences in conveyor speed or misalignment of cradles at the transfer position could equally well serve to actuate the mechanism for decreasing overcompensation of speed or hunting to obtain realignment. The invention should, therefore, be limited only by the spirit and scope of the appended claims.

What is claimed is:

1. Apparatus for synchronizing the operation of two conveyors to permit the transfer of articles from cradles of the first of said two conveyors to the cradles of the second of said two conveyors, comprising means for driving said first conveyor at a substantially constant speed, means for driving said second conveyor, a control system operative on said driving means for said second conveyor to vary the speed of said second conveyor, said control system including a differential gear system having a first and a second input gear, rotational speed-changing means connecting said first conveyor driving means to said first input gear, rotational speed-changing means connecting said second conveyor driving means to said second input gear, said speed-changing means providing equal rotational speeds of said first and said second input gears, an electromechanical system responsive to differences in speed of rotation of said first and second input gears for alternately accelerating and decelerating said second conveyor in decreasing increments about the speed of said first conveyor until the speed of said second conveyor is matched to the speed of said first conveyor and a cradle of said second conveyor is aligned with a cradle of said first conveyor at the point of transfer of articles.

2. Apparatus for synchronizing the operation of two conveyors to permit the transfer of articles from cradles of the first of said two conveyors to the cradles of the second of said two conveyors, comprising means for driving said first conveyor at a substantially constant speed, means for driving said second conveyor, a control system operative on said driving means for said second conveyor to vary the speed of said second conveyor; said control system including a differential gear system having a first and a second input gear, rotational speed-changing means connecting said first conveyor driving means to said first input gear, rotational speed-changing means connecting said second conveyor driving means to said second input gear, said speed-changing means providing equal rotational speeds of said first and said second input gears, a differential arm connected to said first and second input gears and responsive in rotation to differences in speed of rotation of said first and second input gears, a normally open switch disposed adjacent each end of said differential arm; a switching circuit electrically connected to said driving means for said second conveyor and including said switches disposed adjacent opposite ends of said differential arm, rotation of said arm in one direction causing actuation of one of said switches to increase the speed of said second conveyor, rotation of said arm in the opposite direction causing actuation of the other of said switches to decrease the speed of said conveyor, means connected to said second conveyor drive means referencing the rotational position of said second input gear to cradles on said second conveyor, and means adjacent the ends of said differential arm for maintaining said normally open switches open during all travel toward the horizontal of said differential arm and during horizontal disposition of said arm.

3. Apparatus as defined in claim 2 including means for adjusting said means in said second conveyor drive means referencing the rotational position of said second input shaft to cradles on said second conveyor, whereby adjustable referencing may be effected.

4. Apparatus for synchronizing the operation of two conveyors to permit the transfer of articles at a given point from cradles of the first of said two conveyors to the cradles of the second of said two conveyors, comprising means for driving said first conveyor at a substantially constant speed, means for driving said second conveyor, a control system operative on said driving means for said second conveyor, said control system including a differential gear system having a first and a second input gear, rotational speed-changing means connecting said first conveyor driving means to said first input gear, rotational speed-changing means connecting said second conveyor driving means to said second input gear, said speed-changing means providing equal rotational speeds of said first and said second input gears, a pivotally mounted differential arm connected to said first and second input gears and responsive in rotation to differences in speed of rotation of said first and second input gears, said differential arm being normally in a horizontal position when a cradle of said first conveyor is aligned with a cradle of said second conveyor at said given point, a switch trigger mounted adjacent each end of said differential arm, rotation of said arm in one direction causing movement of one of said switch triggers, rotation of said arm in the other direction causing movement of the other of said switch triggers, a normally open switch disposed adjacent each of said switch triggers for actuation thereby, a first electrical circuit for increasing the speed of said second conveyor, one of said switches being included in said first circuit, a second electrical circuit for decreasing the speed of said second conveyor, the other of said switches being included in said second circuit, means for maintaining said switches open when said differential arm is in a horizontal position and during all of said differential arm's travel toward a horizontal position, rotation from the horizontal or dwell in positions other than the horizontal of said differential arm causing one of said switches to close, acceleration of said second conveyor continuing so long as said first switch is closed, deceleration of said second conveyor continuing so long as said second switch is closed, and adjustable means connected to said second conveyor driving means for referencing positions of cradles thereof to the rotational position of said second input gear, whereby said second conveyor is alternately accelerated and decelerated until cradles thereof are aligned with cradles of said first conveyor as they pass said given point.

5. Apparatus as defined in claim 4 including a cam system disposed adjacent each end of said differential arm, a hunting arm and roller mounted on each end of said differential arm, and means for urging said roller into contact with said cam system whereby each said switch trigger is moved by said roller and each said switch is actuated by said trigger only during travel of said differential arm away from a horizontal position and toward said switch trigger.

6. Apparatus as defined in claim 4 including a position-selective slip clutch interposed between said means for driving said second conveyor and said second input gear, said position-selective slip clutch including a plurality of drive positions for said second input gear, power being transmitted from said means for driving said second conveyor to said second input gear only through said drive positions.

7. Apparatus for synchronizing the speed of a first and a second conveyor and for aligning a cradle of said first conveyor with a cradle of said second conveyor to permit the transfer of articles therebetween comprising means for driving said first conveyor at a speed which is normally substantially constant, means for driving said second conveyor, and a system operative on said drive means for said second conveyor to maintain said second conveyor at a speed matching that of said first conveyor and to maintain each cradle of said second conveyor in alignment with a cradle of said first conveyor at a transfer point, said system including a first shaft driven by said first conveyor, a second shaft driven by said second conveyor, compensating gear arrangements to equalize the speeds of said first and second shafts when said first and said second conveyors are travelling at proper speeds to maintain alignment of a cradle of said first conveyor with a cradle of said second conveyor at said transfer point, means for continuously comparing the speeds of said first and said second shafts, means responsive to differences in speed of said two shafts operative upon said second conveyor, drive means to accelerate said second conveyor when the speed of said second conveyor falls behind that of said first conveyor and to decelerate said second conveyor when the speed of said second conveyor exceeds that of said first conveyor, said last-mentioned means being arranged to overcompensate for speed changes in decreasing increments until the speeds of said input shafts are equal, and means interposed between said second conveyor drive means and said second shaft permitting the speed of said second shaft to be matched to that of said first shaft at only discrete points, the spacing of said discrete points being related to the spacing of said cradles on said second conveyor.

References Cited in the file of this patent

UNITED STATES PATENTS

| | | |
|---|---|---|
| 2,076,202 | Lewellen et al. | Apr. 6, 1937 |
| 2,119,247 | Scott | May 31, 1938 |
| 2,808,922 | Lutman | Oct. 8, 1957 |
| 2,920,503 | Burrows | Jan. 12, 1960 |